Patented Apr. 11, 1950

2,503,776

UNITED STATES PATENT OFFICE 2,503,776

CYANINE DYES CONTAINING A SULFO-HYDROCARBON RADICAL

Robert H. Sprague, Rochester, N. Y., assignor to Eastman Kodak Company, Rochester, N. Y., a corporation of New Jersey No Drawing. Application March 21, 1947,
Serial No. 736,405

9 Claims. (Cl. 260—240.5)

This invention relates to cyanine dyes containing a sulfohydrocarbon radical on one or both of the auxochromophoric nitrogen atoms.

Cyanine dyes containing a carboxyalkyl group on one or both of the auxochromophoric nitrogen atoms are known. See United States Patent 2,231,658, dated February 11, 1941. The known dyes containing but one carboxyalkyl group on one of the auxochromophoric nitrogen atoms also contain an anion, such as a halide anion, an alkylsulfate anion, a p-toluenesulfonate anion, a perchlorate anion, a thiocyanate anion, etc., so that the dye consists of a cation and a separate anion which is usually of lower molecular weight relative to the cation. The known dyes containing a carboxyalkyl group on each of the two auxochromophoric nitrogen atoms, on the other hand, are distinguished by the fact that they do not consist of a separate cation and an anion bound together by electrostatic attraction, but rather consist of a "zwitter ion" in which one of the nitrogen atoms of the auxochromophoric group carried a positive charge and a carboxyalkyl group attached thereto is in the form of a negatively charged group owing to the loss of a hydrogen atom from the carboxyl group.

I have now found cyanine dyes in which there is a sulfohydrocarbon radical on one or both of the auxochromophoric nitrogen atoms. These new dyes differ widely in properties from the aforesaid known cyanine dyes containing carboxyalkyl groups. First, my new dyes containing a sulfoalkyl group on but one of the auxochromophoric nitrogen atoms are "zwitter ions" whereas the cyanine dyes containing a carboxyalkyl group on but one of the auxochromophoric nitrogen atoms contain a separate anion, such as halide, p-toluenesulfonate, etc. Second, my new dyes, generally speaking, do not dissolve in ethyl alcohol containing triethylamine as do the aforesaid "zwitter ion" dyes containing a carboxyalkyl group. My new dyes, however, sensitize photographic silver halide emulsions.

Since my new dyes contain no separate anion, they cannot be named satisfactorily strictly according to existing systems of nomenclature for cyanine dyes and it has been necessary to devise a special systematic method for naming these dyes. The system can be illustrated with reference to one of my new dyes which can be represented by the following formula:

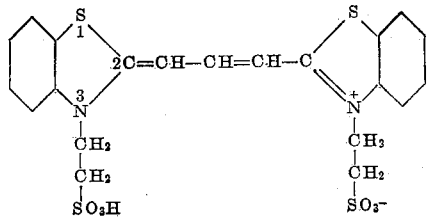

This dye is called anhydro-3,3'-di-β-sulfoethyl-thiacarbocyanine hydroxide. In other words, this system of nomenclature regards this dye as the inner anhydride or salt of the hypothetical thiacarbocyanine hydroxide which would be represented by the following formula:

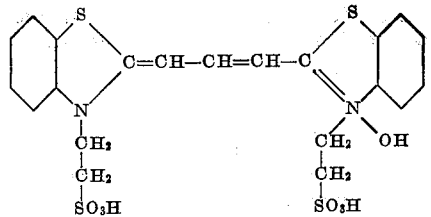

This system of nomenclature for these new dyes avoids the danger of confusion with names of known dyes.

It is, accordingly, an object of my invention to provide anhydro sulfohydrocarbon radical cyanine hydroxides. A further object is to provide a process for preparing these new compounds. A still further object is to provide photographic emulsions sensitized with these new compounds. Other objects will become apparent hereinafter.

The anhydro cyanine hydroxides of my invention can be represented by the following general formula:

I.

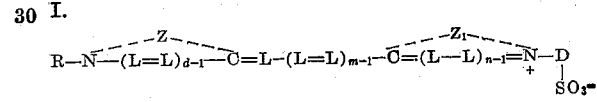

wherein $d$ and $n$ each represents a positive integer of from 1 to 2, $m$ represents a positive integer of from 1 to 3, L represents a methine group (e. g. —CH=, —C(CH₃)=, etc.), R represents an alkyl group (i. e. an alcohol radical), e. g. methyl, ethyl, n-propyl, isobutyl, n-butyl, allyl, β-methallyl, β-methoxyethyl, β-ethoxyethyl, β-hydroxyethyl, β-hydroxypropyl, γ-hydroxypropyl, benzyl (phenylmethyl), β-phenylethyl, carboxymethyl, β-carboxyethyl, γ-carboxypropyl, α-carboxyethyl, carbmethoxymethyl, β-carbmethoxyethyl, carbethoxymethyl, β-carbethoxyethyl, β-acetoxyethyl, β-sulfoethyl, p-sulfobenzyl (p-sulfophenylmethyl), sulfomethyl, γ-sulfopropyl, etc., D represents a divalent hydrocarbon radical, e. g. methylene, ethylene,

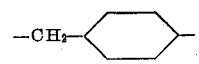

trimethylene, etc., and Z and Z₁ each represents the non-metallic atoms necessary to complete a heterocyclic nucleus containing from 5 to 6 atoms in the heterocyclic ring, e. g. thiazole, 4-phenylthiazole, 4,5-diphenylthiazole, 4-(2-thienyl)thiazole, 4-methylthiazole, benzothiazole, 4-chlorobenzothiazole, 4-methylbenzothiazole, 4-methoxybenzothiazole, 4-ethoxybenzothiazole, 4-phenylbenzothiazole, 5-chlorobenzothiazole, 5-bromobenzothiazole, 5-methylbenzothiazole, 5-methoxybenzothiazole, 5-ethoxybenzothiazole, 5-phenylbenzothiazole, 6-chlorobenzothiazole, 6-bromobenzothiazole, 6-methylbenzothiazole, 6-methoxybenzothiazole, 6-ethoxybenzothiazole, 4-phenyloxazole, benzoxazole, 5-chlorobenzoxazole, 5-methylbenzoxazole, 5-bromobenzoxazole, 5-methoxybenzoxazole, 5-ethoxybenzoxazole, 5-phenyloxybenzoxazole, 4-methylselenazole, 4-phenylselenazole, selenazole, benzoselenazole, 5-chlorobenzoselenazole, α-naphthothiazole, β-naphthothiazole, quinoline, 6-methylquinoline, 6-methoxyquinoline, 6-ethoxyquinoline, 6-chloroquinoline, 4-methoxyquinoline, 4-methylquinoline, 8-methoxyquinoline, β-methylquinoline, 4-chloroquinoline, 3,3-dimethylindolenine, etc.

In accordance with my invention I prepare anhydro cyanine hydroxides containing a sulfohydrocarbon radical by condensing a cyclammonium quaternary salt selected from those represented by the following general formula:

II. 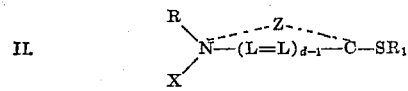

wherein R, L, d and Z have the values given above, R₁ represents an alkyl group, e. g. methyl, ethyl, n-propyl, n-butyl, isobutyl, benzyl or an aryl group, e. g. phenyl, p-chlorophenyl, β-naphthyl, etc., and X represents an anion, e. g. chloride, bromide, iodide, benzenesulfonate, p-toluenesulfonate, methylsulfate, ethylsulfate, acetate, propionate, thiocyanate, perchlorate, etc. with a cyclammonium quaternary salt selected from those represented by the following general formula:

III. 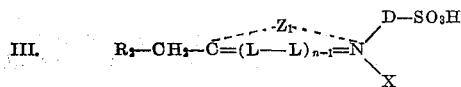

wherein L, n, D, X and Z₁ have the values given above and R₂ represents a hydrogen atom or an alkyl group, e. g. methyl, etc. This condensation gives monomethine anhydro cyanine hydroxides, i. e. anhydro cyanine hydroxides, of the above general formula I wherein m represents 1. This condensation is advantageously effected in the presence of a basic condensating agent, e. g. a tertiary organic amine, for instance, pyridine, triethylamine, tri-n-propylamine, tri-n-butylamine, triisoamylamine, dimethylaniline, diethylaniline, etc. Heat accelerates the condensation. A reaction medium can be employed, e. g. ethyl, n-propyl, isopropyl, n-butyl or isobutyl alcohol.

Typical of the cyclammonium quaternary salts of Formula II are: 2-methylmercaptobenzothiazole metho-p-toluenesulfonate, 5-chloro-2-methylmercaptobenzothiazole ethoethylsulfate, 2-methylmercaptobenzoxazole etho-p-toluenesulfonate, 2-methylmercaptobenzoselenazole metho-p-toluenesulfonate, 2-methylmercapto-β-naphthothiazole etho-p-toluenesulfonate, 2-methylmercapto-α-naphthoxazole metho-p-toluenesulfonate, 2-phenylmercaptoquinoline ethiodide, 2-n-butylmercaptoquinoline ethiodide, 2-phenylmercaptopyridine ethiodide, etc.

Typical of the cyclammonium quaternary salts of Formula III are: 5-chloro-2-methylbenzothiazole p-sulfobenzyl bromide, 2-methylbenzothiazole p-sulfobenzyl bromide, lepidine p-sulfobenzyl bromide, 5-chloro-2-methylbenzothiazole-β-sulfoethyl bromide, 2-methyl-α-naphthothiazole-β-sulfoethyl bromide, 2-methylbenzothiazole-β-sulfoethyl bromide, 2,3,3 - trimethylindolenine β-sulfoethyl bromide, etc. Quaternary salts represented by Formula III can be prepared as described in my copending application Serial No. 730,565, filed February 24, 1947.

In accordance with my invention, I prepare unsymmetrical meso-substituted trimethine anhydro cyanine hydroxides, i. e. unsymmetrical meso-substituted anhydro cyanine hydroxides of the above general Formula I wherein m represents 2, by condensing a cyclammonium quaternary salt selected from those represented by Formula III above with a cyclammonium quaternary salt selected from those represented by the following general formula:

IV. 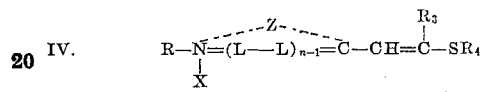

wherein R, L, n, Z and X have the values given above, R₃ and R₄ each represents an alkyl group, e. g. methyl, ethyl, n-propyl, n-butyl, isobutyl, etc. The condensations are advantageously effected in the presence of a basic condensing agent especially a tertiary organic amine, e. g. pyridine, triethylamine, tri-n-propylamine, tri-n-butylamine, triisoamyl amine, etc. Quaternary salts represented by Formula IV above are described for example in United States Patents 2,369,657 and 2,369,646, each dated February 20, 1945, in the copending application of Grafton H. Keyes, Serial No. 620,162, filed October 3, 1945, and (where R represents a carboxyalkyl group) in my copending application Serial No. 730,564, filed February 24, 1947 (now United States Patent 2,481,698, dated September 13, 1949).

I prepare symmetrical trimethine anhydro cyanine hydroxides (substituted in the meso position or not) by condensing a cyclammonium quaternary salt selected from those represented by Formula III above with an ester of an orthocarboxylic acid, e. g. ethyl orthoformate, n-propyl orthoformate, n-butyl orthoformate, ethyl orthoacetate, n-propyl ortho acetate, n-butyl orthoacetate, ethyl orthopropionate, n-propyl orthopropionate, n-butyl orthopropionate, ethyl orthobenzoate, etc. The condensations are advantageously effected in pyridine.

I prepare symmetrical trimethine anhydro cyanine hydroxides substituted in the meso position by condensing a cyclammonium quaternary salt selected from those represented by Formula III above with an ester of a dithiocarboxylic acid, e. g. methyl dithioacetate, ethyl dithioacetate, n-propyl dithioacetate, n-butyl dithioacetate, methyl dithiopropionate ethyl dithiopropionate, n-propyl dithiopropionate, n-butyl dithiopropionate, methyl dithiobenzoate, methyl dithiocyclohexane carboxylate, etc. Advantageously the condensations are effected in the presence of a basic condensing agent. Organic tertiary amines are advantageously employed, e. g. pyridine, triethylamine, tri-n-propylamine, tri-n-butylamine, triisoamylamine, N-methylpiperidine, N-ethylpiperidine, etc. When the stronger amines, such as triethylamine N-methylpiperidine, etc. are employed, it is advantageous to employ these in a pyridine medium.

Trimethine anhydro cyanine hydroxides can also be prepared by condensing a cyclammonium quaternary salt selected from those represented by Formula III above with a cyclammonium quaternary salt selected from those represented by the following general formula:

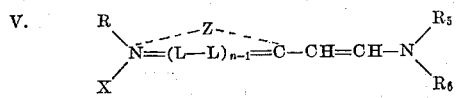

wherein R, L, n, X and Z have the values given above, R₅ represents a member selected from the group consisting of a hydrogen atom, an alkyl group (especially methyl or ethyl) and an acyl group (especially acetyl, propionyl or butyryl) and R₆ represents an aryl group, e. g. phenyl, p-chlorophenyl, p-tolyl, etc.

Typical of these cyclammonium quaternary salts of Formula V are: 2-β-acetanilidovinylbenzoxazole ethiodide, 2-β-acetanilidovinylbenzothiazole ethiodide, 5 - chloro-2-β-acetanilidovinylbenzothiazole ethiodide, 2 - β - acetanilidovinylbenzothiazole metho-p-toluenesulfonate, 2-β-acetanilidovinylquinoline ethiodide, 4-β-acetanilidovinylquinoline n-butiodide, 2-β-acetanilidovinyl-β-naphthothiazole etho-p-toluenesulfonate, 2-β-acetanilido-α-naphthothiazole methomethylsulfate, 2-anilinovinylthiazoline methiodide etc.

These condensations which give the trimethine anhydro cyanine hydroxides are advantageously carried out in the presence of a basic condensing agent (acid-binding agent), e. g. a tertiary amine, especially a tertiary amine having an ionization constant greater than $10^{-5}$ at 25° C., e. g. trialkylamines (triethylamine, tri-n-propylamine, tri-n-butylamine, triisoamylamine, etc.), trihydroxyalkylamines (triethanolamine, tripropanol amine, etc.), N-alkylpiperidines (N-methylpiperidine, N-ethylpiperidine, etc.), and so forth. The condensations are advantageously carried out in a solvent, especially an alcohol, e. g. ethyl, n-propyl, isopropyl, n-butyl or isobutyl alcohol. Pyridine can also be used as a solvent.

Pentamethine anhydro cyanine hydroxides can be prepared by condensing a cyclammonium quaternary salt selected from those represented by Formula III above with a cyclammonium quaternary salt selected from those represented by the following general formula:

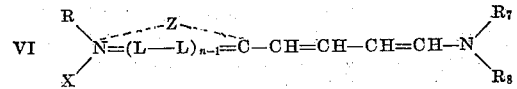

wherein R, L, n, X and Z have the values given above, R₇ represents a member selected from the group consisting of a hydrogen atom and an alkyl group (especially methyl or ethyl) and an acyl group (especially acetyl, propionyl or butyryl), and R₈ represents an aryl group, e. g. phenyl. Typical of such cyclammonium quaternary salts are: 4-(4-acetanilido-1,3-butadienyl)-quinoline ethiodide, 2 - (4 - anilino - 1,3- butadienyl) benzothiazole ethiodide, 2-(4-anilino-1,3-butadienyl) - 5,6 - dimethoxybenzothiazole ethiodide, 2-(-anilino-1,3-butadienyl) - α - naphthothiazole ethiodide, 2-(4-anilino-1,3-butadienyl)-5 - methoxybenzoselenazole ethiodide, 2-(4 - anilino - 1,3 - butadienyl) - 6 - methylquinoline ethiodide, 2 - (4-anilino-3-methyl - 1,3 - butadienyl) benzothiazole ethiodide, etc. These condensations are advantageously carried out in the presence of a basic condensing agent and solvent, e. g. the basic condensing agents and alcohol solvents set forth under Formula V above.

To prepare symmetrical pentamethine dyes of the above general Formula I, I condense at least two molecular proportions of a cyclammonium quaternary salt of Formula III with one molecular proportion of a β-arylaminoacrolein anil salt, e. g. β-anilinoacrolein anil hydrochloride. The condensations are advantageously carried out in the presence of a basic condensing agent and solvent; advantageously the alcohol solvents and tertiary amines set forth above under Formula V.

The following examples will serve to illustrate further the manner of obtaining my new anhydro sulfohydrocarbon radical cyanine hydroxides.

*Example 1.—Anhydro-3-β-carboxyethyl-5,5'-dichloro-9-methyl - 3'' - β - sulfoethylthiacarbocyanine hydroxide*

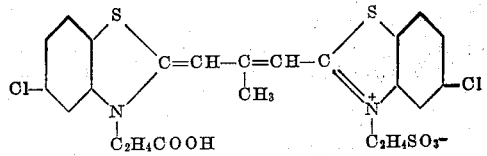

1.6 g. (1 mol.) of 3-β-carboxyethyl-5-chloro-2-thioacetylmethylenebenzothiazoline and 1.9 g. (2 mols.) of methyl-p-toluenesulfonate were heated on the steam bath for 90 minutes. 1.0 g. (1 mol.) of 5-chloro-2-methylbenzothiazole-β-sulfoethylbromide and 25 cc. of pyridine were added and the mixture boiled under reflux for 10 minutes. The purple reaction mixture was chilled to 0° C. and the crystals collected on a filter. The dye was washed on the filter with acetone and water and dried. The yield of dark red crystals was .3 g., 11 per cent. After recrystallization from glacial acetic acid (1000 cc. per gram) the dye melted with decomposition at 283–285° C. The yield of purified material was .2 g., 7 per cent. The dye is a sensitizer from 500 to 640 mμ with maxima at 550 and 630 mμ in a gelatino-silver-bromiodide emulsion.

*Example 2.—Anhydro-3-β-carboxyethyl-5,5'-dichloro - 9 - ethyl-3' - β - sulfoethylthiacarbocyanine hydroxide*

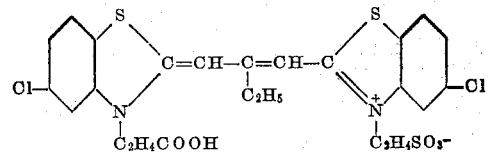

1.64 g. (1 mol.) of 3-β-carboxyethyl-5-chloro-2-thiopropionylmethylenebenzothiazoline and 1.9 g. (2 mols.) of methyl-p-toluenesulfonate were heated on the steam bath for 90 minutes. 1.9 g. (1 mol.) of 5-chloro-2-methylbenzothiazole-β-sulfoethobromide and 25 cc. of pyridine were added and the mixture boiled under reflux for 10 minutes. The mixture was chilled to 0° C., the dye filtered off and washed on the filter with acetone and water. The yield of dark red crystals was .2 g., 7 per cent. The dye was recrystallized from glacial acetic acid (750 cc. per gram) after which it melted with decomposition at 284–286° C. The yield of purified material was .15 g., 5 per cent. The dye is a sensitizer from 500 to 640 mμ with a maximum at 630 mμ in a gelatino-silver-bromiodide emulsion.

*Example 3.—Anhydro-5'-chloro-3-ethyl-3'-β-sulfoethylthiacyanine hydroxide*

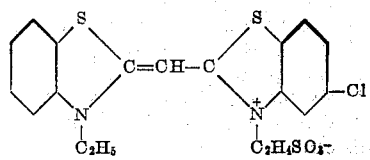

3.5 g. (1 mol.) of 2-ethylmercaptobenzothiazole ethiodide, 3.7 g. (1 mol.) of 5-chloro-2-methylbenzothiazole-β-sulfoethylbromide and 25 cc. of pyridine were boiled together under reflux for 15 minutes. The reaction mixture was cooled, diluted with 150 cc. of ether and chilled to 0° C. The dye was collected on a filter, washed with absolute ethyl alcohol and dried. The yield of yellow crystals was .4 g., 9 per cent. After recrystallization from glacial acetic acid (430 cc. per gram) the dye melted above 320° C. The yield of purified material was .35 g., 8 per cent. The dye is a sensitizer to 490 m$\mu$ with a maximum at 465 m$\mu$ in a gelatino-silver-chlorobromiodide emulsion.

*Example 4.—Anhydro-5-chloro-1'-ethyl-3-β-sulfoethylthia-2'-cyanine hydroxide*

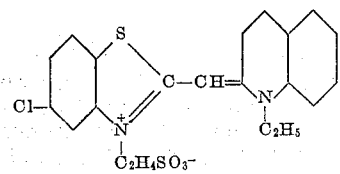

4.37 g. (1 mol.) of 2-phenylmercaptoquinoline etho-p-toluenesulfonate, 3.72 g. (1 mol.) of 5-chloro-2-methylbenzothiazole - β - sulfoethylbromide and 25 cc. of pyridine were boiled under reflux for 5 minutes. The pink reaction mixture was cooled, diluted with 150 cc. of ether and the ether solution decanted from the sticky precipitate. The product was dissolved in 15 cc. of hot methyl alcohol and 5 cc. of glacial acetic acid added. Crystals of dye separated out of the solution at once. The product was collected on a filter, washed on the filter with acetone and water and dried. The yield of brown crystals was .6 g., 13 per cent. After recrystallization from glacial acetic acid the dye melted above 320° C. The yield of purified red crystals was .5 g., 11 per cent. The dye is a sensitizer from 500 to 550 m$\mu$ with a maximum at 530 m$\mu$ in a gelatino-silver-bromiodide emulsion.

*Example 5.—Anhydro-1'-ethyl-3-β-sulfoethylthia-2'-cyanine hydroxide*

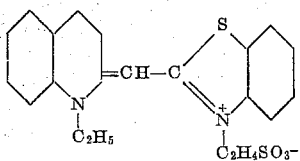

4.37 g. (1 mol.) of 2-phenylmercaptoquinoline etho-p-toluenesulfonate, 3.4 g. (1 mol.) of 2-methylbenzothiazole-β-sulfoethobromide and 25 cc. of pyridine were boiled together under reflux for 5 minutes. The reaction mixture was cooled, diluted with 150 cc. of ether and the ether solution decanted from the precipitate. The product was dissolved in 15 cc. of hot methyl alcohol and 5 cc. of glacial acetic acid added. Crystals of dye separated out of the solution at once. The product was collected on a filter, washed on the filter with acetone and water and dried. The yield of brown crystals was .2 g., 5 per cent. After recrystallization from glacial acetic acid (200 cc. per gram) the product was .175 g., 4 per cent. The dye is a sensitizer from 500 to 550 m$\mu$ with a maximum at 530 m$\mu$ in a gelatino-silver-bromiodide emulsion.

*Example 6.—Anhydro-1-ethyl-1'-p-sulfobenzyl-2,4'-cyanine hydroxide*

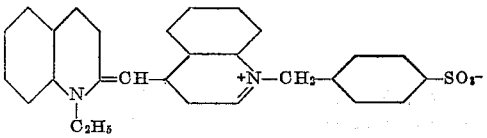

2.2 g. (1 mol.) of 2-phenylmercaptoquinoline etho-p-toluene-sulfonate, 1.97 g. (1 mol.) of lepidine-p-sulfobenzylbromide, 1.0 g. (2 mols) of triethylamine and 25 cc. of absolute ethyl alcohol were boiled together under reflux for 30 minutes. In order to facilitate the reaction 15 cc. of water was added after 10 minutes of heating. The purple reaction mixture was chilled to 0° C. and the product collected on a filter. The dye was washed on the filter with acetone and water and dried. The crude product was recrystallized several times from 50% methyl alcohol (2000 cc. per gram). The yield of purified material was .1 g., 4%. The pure dye was obtained as green crystals which melted at 305–308° with decomposition. The dye is a sensitizer from 550–600 m$\mu$ with a maximum at 580 m$\mu$ in a gelatino-silver-bromiodide emulsion.

*Example 7.—Anhydro - 3 - ethyl - 1'-p-sulfobenzylthia-4'-cyanine hydroxide*

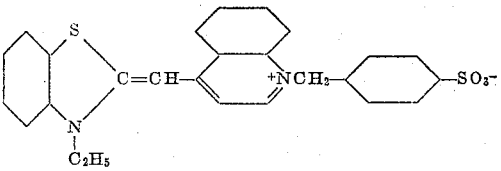

1.76 g. (1 mol.) of 2-ethylmercaptobenzothiazole ethiodide, 2.0 g. (1 mol) of lepidine-p-sulfobenzyl bromide, 1.0 g. (2 mols) of triethylamine and 25 cc. of absolute ethyl alcohol were boiled together under reflux for 30 minutes. After 10 minutes heating 15 cc. of water was added to the reaction mixture. The dye was isolated in the same manner as Example 6 and recrystallized from 50% methyl alcohol (2000 cc. per gram). The yield of purified material was .2 g., 8.5%. The pure dye was obtained as red crystals which melted above 320° C. The dye is a sensitizer from 500 to 570 m$\mu$ with a maximum at 530 m$\mu$ in a gelatino-silver-bromoiodide emulsion.

*Example 8.—Anhydro-5,5'-dichloro - 3,3'-di-β-sulfoethylthiacarbocyanine hydroxide pyridine salt*

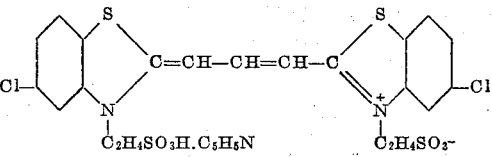

1.86 g. (2 mols) of 5-chloro-2-methylbenzothiazole-β-sulfoethylbromide, 1.5 g. (4 mols) of ethylorthoformate and 15 cc. of pyridine were boiled together under reflux for 10 minutes. Crystals of dye separated out rapidly from the boiling reaction mixture. The mixture was chilled to 0° C., the dye collected on a filter and washed on the filter with acetone and water. The product was recrystallized from methyl alcohol (140 cc. per gram). The yield of purified material was .1 g., 6%. The pure dye was obtained as minute green crystals with a bright reflex. The dye melted above 320° C. The dye is a sensitizer from 500 to 620 m$\mu$ with a maximum at 600 mμ in a gelatino-silver-bromoiodide emulsion.

*Example 9.—Anhydro-5,5'-dichloro-9-ethyl-3,3'-di-β-sulfoethylthiacarbocyanine hydroxide*

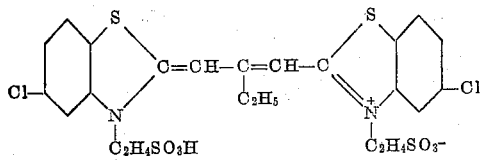

1.86 g. (2 mols) of 5-chloro-2-methylbenzothiazole-β-sulfoethylbromide, 3.5 g. (8 mols) of ethylorthopropionate and 15 cc. of pyridine were boiled together under reflux for 3 minutes. The reaction mixture was cooled to room temperature, diluted with 200 cc. of ether and the ether solution decanted off from the sticky precipitate. The precipitate was stirred with 20 cc. of acetone and chilled to 0° C. A small amount of colorless solid was filtered off and the filtrate acidified with 15 cc. of 10% alcoholic hydrochloric acid. Coppery crystals of dye separated out of the solution on chilling. The dye was collected on a filter, washed on the filter with acetone and water and dried. The yield of dye was .2 g., 13%. The dye was recrystallized from methyl alcohol (250 cc. per gram). The yield of purified material was .1 g., 7%. The dye melted above 300° C. The dye is a sensitizer from 500 to 660 mμ with a maximum at 640 mμ in a gelatino-silver-bromoiodide emulsion.

*Example 10.—Anhydro - 5,5'-dichloro-9-methyl-3,3'-di-β-sulfoethylthiacarbocyanine hydroxide*

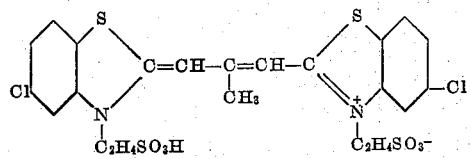

12.4 g. (2 mols) of 5-chloro-2-methylbenzothiazole β-sulfoethyl bromide, 3.5 g. (2 mols) of methyldithioacetate, 3.3 g. (2 mols) of triethylamine and 40 cc. of pyridine were boiled together under reflux for 10 minutes. The reaction mixture was cooled to room temperature, poured into 500 cc. of 10% acetic acid and chilled to 0° C. The product was collected on a filter, washed on the filter with water and dried. The product was recrystallized from methyl alcohol (600 cc. per gram of dye). The yield of purified material was .5 g., 5%. The dye was obtained as purple crystals which melted above 310° C. The dye is a sensitizer from 500 to 650 mμ with a maximum at 640 mμ in a gelatino-silver-bromoiodide emulsion.

*Example 11.—Anhydro-5,5'-dichloro - 3,3'-di-p-sulfobenzylthiacarbocyanine hydroxide*

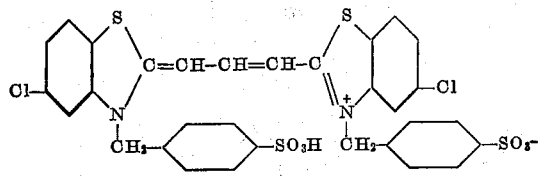

9.0 g. (2 mols) of 5-chloro-2-methylbenzothiazole p-sulfobenzylbromide, 6.0 g. (4 mols) of ethylorthoformate and 75 cc. of pyridine were boiled under reflux for 15 minutes. The reaction mixture was cooled to room temperature and the pyridine decanted off from the sticky precipitate. 50 cc. of 10% alcoholic hydrochloric acid was added to the precipitate whereupon crystals of dye separated at once. The product was collected on a filter, washed on the filter with methyl alcohol and water and dried. The yield of dark green crystals was 2.1 g., 28%. The product was purified by solution in hot methyl alcohol plus triethylamine (500 cc. per gram of dye) and precipitation from the cooled, filtered solution with acetic acid. The yield of purified material was 20%. The dye was obtained as bronze crystals which melted above 310° C. The dye is a sensitizer from 500 to 620 mμ with a maximum at 600 mμ in a gelatino-silver-bromide emulsion.

*Example 12.—Anhydro-3-ethyl-1'-p-sulfobenzylthia-4'-carbocyanine hydroxide*

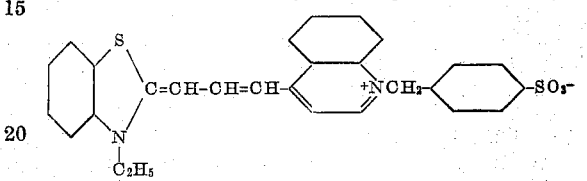

2.0 g. (1 mol) of 2-β-acetanilidovinylbenzothiazole ethiodide, 2.0 g. (1 mol) of lepidine p-sulfobenzylbromide, 1.0 g. (2 mols) of triethylamine and 25 cc. of absolute ethyl alcohol were boiled together under reflux for 30 minutes. The reaction mixture was chilled to 0° C., filtered and the product washed on the filter with acetone and water. The crude product was recrystallized from 50% acetic acid (600 cc. per gram). The yield of purified material was .65 g., 20%. The purified dye was obtained as dull blue crystals which melted at 278–281° C. with decomposition. The dye is a sensitizer from 630 to 690 mμ with a maximum at 670 mμ in a gelatino-silver-bromoiodide emulsion.

*Example 13.—Anhydro - 5,5'- dichloro-3,3'- di-p-sulfobenzylthiadicarbocyanine hydroxide*

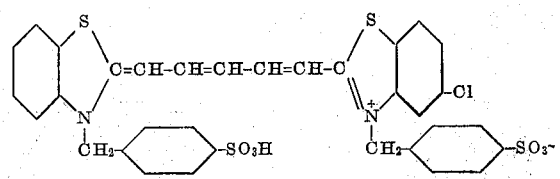

4.0 g. (2 mols) of 5-chloro-2-methylbenzothiazole p-sulfobenzyl bromide, 1.3 g. (1 mol) of β-anilinoacrolein anil hydrochloride, 2.0 g. (4 mols) of triethylamine and 25 cc. of pyridine were boiled together under reflux for 3 minutes. Green crystals of dye separated out rapidly from the boiling reaction mixture. The mixture was chilled to 0° C., filtered and the product washed on the filter with methyl alcohol. The yield of green crystals was .35 g., 9%. The dye was recrystallized from 50% acetic acid (1400 cc. per gram). The yield of purified material was .1 g., 3%. The pure dye melted above 310° C. The dye is a sensitizer in a gelatino-silver-bromoiodide emulsion.

*Example 14.—Anhydro - 1' - ethyl-6'-methoxy-5-phenyl-3-β-sulfoethylthia-2'- cyanine hydroxide*

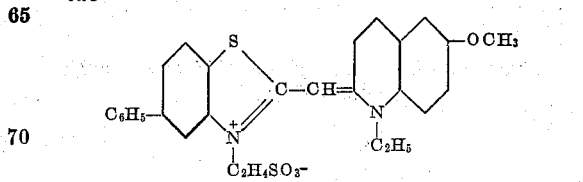

2.25 g. (1 mol) of 2-methyl-5-phenylbenzothiazole and 1.9 g. (1 mol) of 2-bromoethanesulfonic acid were heated together in a test tube at 210–

215° C. for two minutes. The brown mixture was cooled and 4.7 g. (1 mol) of 6-methoxy-2-phenyl-mercaptoquinoline etho-p-toluenesulfonate and 20 cc. of pyridine were added. The mixture was boiled for 5 minutes with stirring. The solution was poured into 50 cc. of cold water, the dye filtered off, washed on the filter with water and dried. The yield of brown crystals of dye was 2.3 g., 44%. After recrystallization from 150 cc. of 95% pyridine the dye was obtained as orange crystals which melted above 310° C. The yield of purified dye was .3 g., 6%. The dye is a sensitizer to 580 mµ with a maximum of 540 mµ in a gelatino-silver-bromoiodide emulsion.

The 3-β-carboxyethyl-5-chloro-2-thioacetyl-methylenebenzothiazoline and the 3-β-carboxyethyl-5-chloro-2-thiopropionylmethylenebenzothiazoline employed in Examples 1 and 2 above are described in my copending application Serial No. 730,564, filed February 24, 1947 (now United States Patent 2,481,698, dated September 13, 1949), and are prepared by condensing 5-chloro-2-methylbenzothiazole β-carboxyethiodide with methyl dithioacetate in the presence of triethylamine in a pyridine medium, and by condensing 5-chloro-2-methylbenzothiazole β-carboxyethiodide with methyl dithiopropionate, in the presence of triethylamine in a pyridine medium.

The quaternary salts represented by Formula III are described in my copending application Serial No. 730,565, filed February 24, 1947. The following examples illustrate the preparation of these quaternary salts.

*Example 15.—5-chloro-2-methylbenzothiazole p-sulfobenzyl bromide*

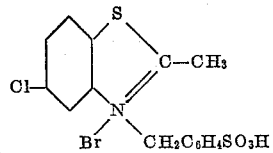

18.4 g. (1 mol.) of 5-chloro-2-methylbenzothiazole and 25.1 g. (1 mol.) of p-sulfobenzylbromide were heated together at 160° C. in an oil bath for 12 hours. The brown viscous product was stirred with 50 cc. of acetone until crystalline, chilled to 0° C. and filtered. The product was washed on the filter with acetone and dried in vacuum over calcium chloride. The yield of gray hygroscopic solid was 9.1 g., 31 per cent. The p-sulfobenzyl bromide employed above can be prepared as follows. 86.0 g. (1 mol.) of p-toluenesulfonic acid and 400 g. of bromoform were heated to 140° C. in an oil bath. The mixture was stirred mechanically while 80 g. (1 mol.) of bromine was added dropwise over a period of 30 minutes. The mixture was heated and stirred 30 minutes longer, during which time the color of the bromine disappeared. The mixture was chilled to 0° C. the product collected on a filter, washed on the filter with 15 cc. of bromoform and dried in a vacuum over potassium hydroxide sticks. The yield of hygroscopic gray solid product was 53.3 g., 42 per cent.

*Example 16.—2-methylbenzothiazole p-sulfobenzylbromide*

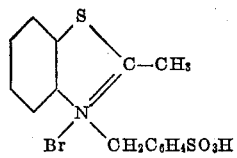

This was prepared as in Example 15 from 16.4 g. (1 mol.) of 2-methylbenzothiazole and 27.6 g. (1 mol.) of p-sulfobenzyl bromide. The yield of brownish crystals was 4.8 g., 11 per cent.

*Example 17.—Lepidine p-sulfobenzylbromide*

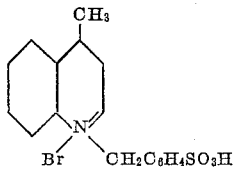

This was prepared as in Example 15 from 14.3 g. (1 mol.) of lepidine and 25.1 g. (1 mol.) of p-sulfobenzyl bromide. The yield of yellow crystals was 6.6 g., 17 per cent.

*Example 18.—5-chloro-2-methylbenzothiazole-β-sulfoethylbromide*

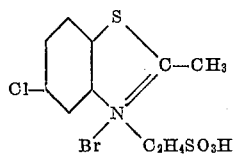

18.35 g. (1 mol.) of 5-chloro-2-methylbenzothiazole and 18.9 g. (1 mol.) of 2-bromoethanesulfonic acid were heated over a flame until the temperature of the melt reached 220° C. The temperature was maintained between 200 and 220° C. for 5 minutes, the mixture was cooled, crushed under acetone and chilled to 0° C. The product was collected on a filter, washed on the filter with acetone and dried. The yield of pinkish crystals was 25.6 g., 69 per cent. The 2-bromoethanesulfonic acid employed above can be prepared as follows. 110 g. (1 mol.) of finely powdered sodium 2-bromoethane sulfonate, 200 g. (1 mol. plus 10 per cent excess) of a 10 per cent solution of dry hydrogen chloride in absolute ethyl alcohol and 1000 cc. of absolute ethyl alcohol were stirred mechanically for one hour at room temperature. The precipitated sodium chloride was filtered off, washed on the filter with absolute ethyl alcohol and the filtrate and washings concentrated as far as possible on the steam bath using the water pump. The mixture was diluted with 500 cc. of dry benzene and again concentrated under reduced pressure. The residue was distilled slowly under as high a vacuum as possible. The product was a heavy oil which solidified to colorless crystals on cooling. The product boiled at 160 to 162° C. at 2 mm. pressure. The yield of crude product was 89.8 g., 91 per cent and 65.0 g., 66 per cent after one distillation.

*Example 19.—2-methyl-α-naphthothiazole-β-sulfoethylbromide*

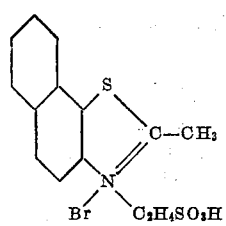

This was prepared as in Example 15 from 19.9 g. (1 mol.) of 2-methyl-α-naphthothiazole and 18.9 g. (1 mol.) of 2-bromoethane sulfonic acid. The yield of brown crystals was 30.7 g., 79 per cent.

Example 20.—2-methylbenzothiazole-β-sulfoethylbromide

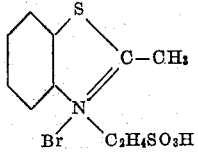

This was prepared as in Example 15 from 14.9 g. (1 mol.) of 2-methylbenzothiazole and 18.9 g. (1 mol.) of 2-bromoethane sulfonic acid. The yield of gray crystals was 6.6 g., 20 per cent.

Example 21.—2,3,3-trimethylindolenine-β-sulfoethylbromide

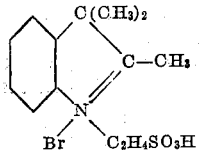

This was prepared as in Example 15 from 15.9 g. (1 mol.) of 2,3,3-trimethylindolenine and 18.0 g. (1 mol.) of 2-bromoethanesulfonic acid. The yield of pink crystals was 16.6 g., 48 per cent.

The cyclammonium carboxyalkyl quaternary salts can be prepared by the methods disclosed in the prior art and also by hydrolysis of the corresponding carbalkoxyalkyl compounds. The following example illustrates further the preparation of the cyclammonium carboxyalkyl quaternay salts by the hydrolysis of the corresponding cyclammonium carbalkoxyalkyl quaternary salts.

Example 22.—Lepidine carboxymethobromide

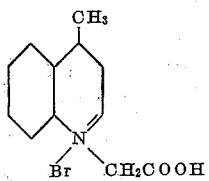

20.0 g. (1 mol.) of lepidine carbethoxymethobromide and 100 cc. of 48 per cent hydrobromic acid were boiled together under reflux for 30 minutes. The mixture was concentrated nearly to dryness under reduced pressure and the sticky brown product dissolved in 100 cc. of absolute ethyl alcohol. The solution was chilled to 0° C., the product collected on a filter and washed on the filter with alcohol. The yield of tan crystals was 13.7 g., 75 per cent.

The cyclammonium carbalkoxyalkyl quaternary salts can be prepared by known methods.

4-phenylbenzothiazole is described in the copending application of Gertrude Van Zandt and Leslie G. S. Brooker, Serial No. 709,414, filed November 13, 1946 (now United States Patent 2,485,679, dated October 25, 1949), and can be prepared by oxidizing o-thioacetamidobiphenyl with potassium ferricyanide, in the presence of aqueous sodium hydroxide. Quaternary salts of 4-phenylbenzothiazole can be prepared by heating the base with p-sulfobenzyl bromide, β-sulfoethyl bromide, etc.

5-phenylbenzothiazole is described in the copending application of Gertrude Van Zandt and Leslie G. S. Brooker, Serial No. 711,816, filed November 22, 1946, and can be prepared by reducing bis (3-nitro-4-biphenylyl) disulfide with zinc and acetic acid and acetylating the reduction product with acetic anhydride. Quaternary salts of 5-phenylbenzothiazole can be prepared by heating the 5-phenylbenzothiazole with p-sulfobenzyl bromide, β-sulfoethyl bromide, etc.

In the preparation of photographic silver halide emulsions containing my new anhydro cyanine hydroxides, it is only necessary to disperse the dyes in the emulsions. Ordinarily this is advantageously accomplished by forming a water-soluble salt of the anhydro cyanine hydroxide and dissolving the water-soluble salt in water or methanol or a mixture of water and methanol, and dispersing the resulting solution in the emulsion. The salts are advantageously formed by adding to the anhydro cyanine hydroxide, wet with a little water, or methanol, an alkali metal hydroxide, or an amine, e. g. methylamine, ethylamine, ethanolamine, diethanolamine, triethanolamine, pyridine, N-methylpiperidine, n-propylamine, n-butylamine, isopropylamine, β-ethoxyethylamine, etc. and taking up the salt which forms in a suitable solvent, e. g. water, methanol or a mixture of water and methanol.

Sensitization by means of my new anhydrocyanine hydroxides and their salt forms is primarily directed to the ordinarily employed gelatino-silver-halide developing-out emulsions, e. g. gelatino - silver-chloride, -chlorobromide, -chlorobromoiodide, -bromide, and -bromoiodide emulsions. The anhydrocyanine hydroxides or their salts are advantageously added to the washed, finished emulsions and should be uniformly distributed throughout the emulsions.

The concentration of the anhydrocyanine hydroxides or their salts can vary widely, e. g. from about 5 to about 100 mg. per liter of flowable emulsion. The concentration will vary according to the type of light sensitive material and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of my new anhydro cyanine hydroxides, the following procedure is satisfactory: a quantity of the anhydro cyanine hydroxide in salt form is dissolved in water or methyl alcohol or a mixture of water and methyl alcohol, and a volume of the solution containing from 5 to 100 mg. of the salt of the anhydro cyanine hydroxide is slowly added to about 1000 cc. of a gelatino-silver-halide emulsion with stirring. Stirring is continued until the salt of the anhydro cyanine hydroxide is uniformly dispersed. With the more powerful of my new anhydro cyanine hydroxides, 10 to 50 mg. of anhydro cyanine hydroxide or salt thereof per 1000 cc. of emulsion suffice to produce the maximum sensitizing effect with the ordinary gelatino-silver-halide emulsions. The above statements are only illustrative and are not to be understood as limiting my invention in any sense, as it will be apparent that my new anhydro cyanine hydroxides and salts thereof can be incorporated by other methods in many of the photographic emulsions customarily employed in the art, such, for instance, as by bathing a plate or film upon which an emulsion is coated, in a solution of the anhydro cyanine hydroxide (or its salt form) in an appropriate solvent, although such a method is ordinarily not to be preferred. The emulsion claims are intended to cover any combination of these new anhydro cyanine hydroxides (or salts thereof) with a photographic silver halide emulsion whereby the anhydro cyanine hydroxides or salts thereof exert a sensitizing effect on the emulsion.

What I claim as my invention and desire to be secured by Letters Patent of the United States is:

1. The anhydro cyanine hydroxides which are represented by the following general formula:

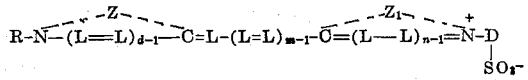

wherein $d$ and $n$ each represents a positive integer of from 1 to 2, $m$ represents a positive integer of from 1 to 3, L represents a methine group, R represents an alkyl group, D represents a divalent hydrocarbon radical, and Z and $Z_1$ each represents the non-metallic atoms necessary to complete a heterocyclic nucleus selected from the group consisting of heterocyclic nuclei of the benzothiazole series and heterocyclic nuclei of the quinoline series, and the metal and ammonium salt forms of said anhydro cyanine hydroxides.

2. The anhydro cyanine hydroxide represented by the following formula:

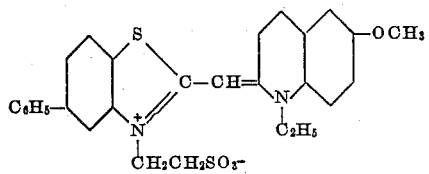

3. The anhydro cyanine hydroxide represented by the following formula:

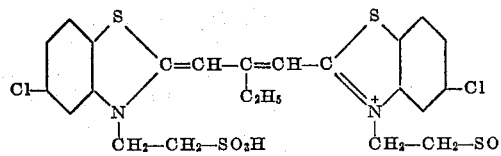

4. The anhydro cyanine hydroxide represented by the following formula:

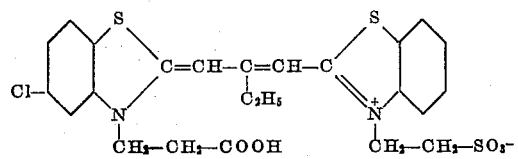

5. The anhydro cyanine hydroxides represented by the following general formula:

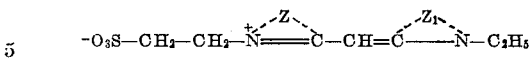

wherein Z represents the non-metallic atoms necessary to complete a heterocyclic nucleus of the benzothiazole series and $Z_1$ represents the non-metallic atoms necessary to complete a heterocyclic nucleus of the quinoline series.

6. The anhydro cyanine hydroxides represented by the following general formula:

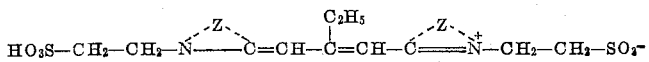

wherein Z represents the non-metallic atoms necessary to complete a heterocyclic nucleus of the benzothiazole series.

7. The anhydro cyanine hydroxides represented by the following general formula:

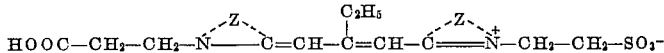

wherein Z represents the non-metallic atoms necessary to complete a heterocyclic nucleus of the benzothiazole series.

8. The anhydro cyanine hydroxide represented by the following formula:

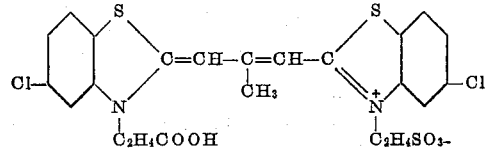

9. The anhydro cyanine hydroxide represented by the following formula:

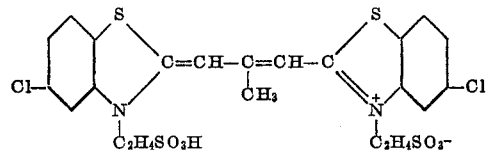

ROBERT H. SPRAGUE.

REFERENCES CITED

The following references are of record in the file of this patent:

UNITED STATES PATENTS

| Number | Name | Date |
|---|---|---|
| 2,430,558 | Caroll | Nov. 11, 1947 |

Certificate of Correction

April 11, 1950

Patent No. 2,503,776

ROBERT H. SPRAGUE

It is hereby certified that errors appear in the printed specification of the above numbered patent requiring correction as follows:

Column 3, line 51, for "condensating" read *condensing*; column 5, line 62, for "2-(-anilino" read *2-(4-anilino*; column 15, lines 49 to 53 inclusive, for the right-hand portion of the formula reading

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*